US012148547B2

(12) United States Patent
Deng et al.

(10) Patent No.: US 12,148,547 B2
(45) Date of Patent: Nov. 19, 2024

(54) METHOD FOR DEVELOPING EPOXY RESIN IMPREGNATED GLASS FIBER DC BUSHING

(71) Applicants: WUHAN NARI LIMITED LIABILITY COMPANY OF STATE GRID ELECTRIC POWER RESEARCH INSTITUTE, Hubei (CN); NARI GROUP CORPORATION, Jiangsu (CN)

(72) Inventors: Jiangang Deng, Wuhan (CN); Zhenbo Lan, Wuhan (CN); Zhuolin Xu, Wuhan (CN); You Song, Wuhan (CN); Yu Nie, Wuhan (CN); Lei Ke, Wuhan (CN); Hao Zhan, Wuhan (CN); Jun Fu, Wuhan (CN); Qiang Sun, Wuhan (CN); Yuefei Mao, Wuhan (CN); Qian Ma, Wuhan (CN); Qianwen Zhou, Wuhan (CN); Kaikai Gu, Wuhan (CN); Haoxin Li, Wuhan (CN); Lei Shi, Wuhan (CN); Yu Xu, Wuhan (CN); Cheng Tang, Wuhan (CN); Yakai Peng, Wuhan (CN); Youyi Shi, Wuhan (CN)

(73) Assignees: WUHAN NARI LIMITED LIABILITY COMPANY OF STATE GRID ELECTRIC POWER RESEARCH INSTITUTE, Hubei (CN); NARI GROUP CORPORATION, Jiangsu (CN)

( * ) Notice: Subject to any disclaimer, the term of this patent is extended or adjusted under 35 U.S.C. 154(b) by 165 days.

(21) Appl. No.: 17/913,873

(22) PCT Filed: Dec. 7, 2020

(86) PCT No.: PCT/CN2020/134362

§ 371 (c)(1),
(2) Date: Sep. 23, 2022

(87) PCT Pub. No.: WO2022/027889

PCT Pub. Date: Feb. 10, 2022

(65) Prior Publication Data

US 2023/0343489 A1 Oct. 26, 2023

(30) Foreign Application Priority Data

Aug. 6, 2020 (CN) ........................ 202010782781.X

(51) Int. Cl.
*H01B 17/42* (2006.01)
*H01B 17/58* (2006.01)
(Continued)

(52) U.S. Cl.
CPC ........... *H01B 17/42* (2013.01); *H01B 17/583* (2013.01); *H01B 17/64* (2013.01); *H01B 19/00* (2013.01)

(58) Field of Classification Search
CPC ...... H01B 17/42; H01B 17/583; H01B 17/64; H01B 19/00
(Continued)

(56) References Cited

U.S. PATENT DOCUMENTS 10,297,371 B2 5/2019 Lee
2018/0144846 A1 5/2018 Lee
2021/0159682 A1* 5/2021 Sjöberg ................ H01B 17/301

FOREIGN PATENT DOCUMENTS

CN 101315834 A 12/2008
CN 201402952 Y 2/2010
(Continued)

OTHER PUBLICATIONS

"Assembly Process Of Transformer", Jun. 30, 1998, Local Records of Transformer Manufacturing Technology, Editorial Board,, ISBN: 7-111-06069-5, 6 pgs.
(Continued)

*Primary Examiner* — James D Sells
(74) *Attorney, Agent, or Firm* — Cooper Legal Group, LLC

(57) ABSTRACT

A method for developing an epoxy resin impregnated glass fiber Direct Current (DC) bushing, comprising: according to
(Continued)

length parameters of each layer of capacitive screen or resistive screen designed depending on insulation requirements, selecting bushing design parameters, determining a winding machine program according to the bushing design parameters, and winding a core body according to the winding machine program, wherein during the core body winding process, the core body begins to be initially cured; after the core body is wound, curing the core body by an oven according to a preset oven temperature and duration; machining the cured core body according to a preset core body design drawing; after the inner wall of a flange is polished and cleaned and is heated and pretreated by the oven, injecting glue at the position of a glue injection hole of the flange for gluing the core body and the flange; sequentially assembling a collector ring, a hollow composite insulator, and a voltage-equalizing sealing cover on the glued core body, and mounting a conducting rod, a wiring board, and a voltage-equalizing ball; and performing various tests on the bushing according to a preset bushing standard for a DC system.

9 Claims, 4 Drawing Sheets

(51) Int. Cl.
*H01B 17/64* (2006.01)
*H01B 19/00* (2006.01)

(58) Field of Classification Search
USPC .......................................................... 156/172
See application file for complete search history.

(56) References Cited

FOREIGN PATENT DOCUMENTS

| | | | |
|---|---|---|---|
| CN | 102146195 | A | 8/2011 |
| CN | 105070428 | A | 11/2015 |
| CN | 107508224 | A | 12/2017 |
| CN | 108492945 | A | 9/2018 |
| CN | 207883411 | U | 9/2018 |
| CN | 209461225 | U | 10/2019 |
| CN | 209544034 | U | 10/2019 |
| CN | 110783721 | A | 2/2020 |
| CN | 112002504 | A | 11/2020 |

OTHER PUBLICATIONS

International Search Report in the international application No. PCT/CN2020/134362, mailed on Mar. 26, 2021, 3 pgs.
“Safe Use of Electricity”, Aug. 2016, Yanhong Guo, Wulin He and Xingxi Yan, Southwest Jiaotong University Press, 6 pgs.
“High Voltage Electrical Insulation Technology 2nd Edition”, Oct. 2007, Zhang Yan and Deheng Zhu, China Electric Power Press, 4 pgs.

* cited by examiner

METHOD FOR DEVELOPING EPOXY RESIN IMPREGNATED GLASS FIBER DC BUSHING

CROSS-REFERENCE TO RELATED APPLICATION

This application is based upon and claims the benefit of priority from Chinese Patent Application No. 202010782781.X, filed Aug. 6, 2020, the content of which is incorporated herein by reference in its entirety.

TECHNICAL FIELD

The present disclosure relates to the technical field of a Direct Current (DC) bushing, and in particular to a method for developing an epoxy resin impregnated glass fiber DC bushing.

BACKGROUND

The DC bushing, as a current-carrying conductor, passes through a box or a wall with different potential from the potential of the DC bushing, and plays the role of insulation and mechanical support, which is one of the key devices for ensuring the safe and stable operation of the system. The traditional DC bushing (of the converter transformer) mostly adopts an oil-impregnated paper and glue-impregnated paper production process. However, the oil-impregnated paper bushing has a risk of oil leakage, and the glue-impregnated paper bushing is prone to absorption of moisture, causing several bushing failures and accidents occurred during the operation of the system. Compared with these two types of bushings, the DC bushing (of the converter transformer) produced through the epoxy resin impregnated glass fiber process has a pure solid structure, is oil-free and maintenance-free, does not decompose, and has excellent mechanical strength and anti-seismic performance without risk of combustion and explosion. The core of the bushing is made of a non-moisture-absorbing material with a lower dielectric loss. The technical difficulties in adopting such a process are as follows. (1) The winding temperature of the epoxy resin impregnated glass fiber can affect the initial curing process of the core of the bushing. (2) The design of the length and the thickness of the capacitive screen of the core of the DC bushing (of the converter transformer) can affect the field strength distribution of the bushing. (3) The design of the connection between the tap or voltage screen of the core of the DC bushing (of the converter transformer) and outside of the bushing can affect the space charge accumulation effect at the medium interface of the bushing.

SUMMARY

The purpose of embodiments of the present disclosure is to provide a method for developing an epoxy resin impregnated glass fiber Direct Current (DC) bushing.

To achieve the above purpose, the embodiments of the present disclosure provide the technical solutions as follows. A method for developing an epoxy resin impregnated glass fiber DC bushing includes the following operations.

A bushing design parameter is selected according to a length parameter of each layer of capacitive screen or resistive screen designed depending on insulation requirements, a winding machine program is determined according to the bushing design parameter, and a core is wound according to the winding machine program, in which the core begins to be initially cured during winding of the core.

After the winding of the core is completed, the core is cured by an oven according to a preset oven temperature and duration.

The cured core is machined according to a preset core design drawing.

After an inner wall of a flange is polished and cleaned and is subjected to a heating pretreatment by an oven, glue is injected at a position of a glue injection hole of the flange to glue the core and the flange.

A collector ring, a hollow composite insulator and a voltage-equalizing sealing cover are sequentially assembled on the glued core, and a conductive rod, a wiring board and a voltage-equalizing ball are mounted on the glued core.

Various tests are performed on the bushing according to a preset standard of bushing for DC system.

In some optional embodiments, a thickness between each two layers of capacitive screens or resistive screens is the same, and a thickness of each layer of capacitive screen or resistive screen is selected from the bushing design parameter in a range of 2.5 mm to 5 mm.

In some optional embodiments, a winding temperature in the winding machine program is in a range of 90° C. to 120° C.

In some optional embodiments, during the machining of the cured core, an amount of feed for rough machining is no more than 0.5 mm, and an amount of feed for fine machining is no more than 0.1 mm.

In some optional embodiments, the method further includes the following operation. After the glue is injected at the position of the glue injection hole of the flange, it is required to stand for 24 hours.

In some optional embodiments, the method further includes the following operation. After the inner wall of the flange is polished and cleaned, an adhesive is evenly applied at the inner wall of the flange.

In some optional embodiments, the method further includes the following operation. After the heating pretreatment is performed by the oven, the flange is secured to the core and a sealing ring is mounted on the core.

In some optional embodiments, the method further includes the following operation. Before the collector ring, the hollow composite insulator and the voltage-equalizing sealing cover are sequentially assembled on the glued core and the conductive rod, the wiring board and the voltage-equalizing ball are mounted on the glued core, an oil-impregnated end of the glued core is sprayed with paint.

The embodiments of the present disclosure provide a method for developing an epoxy resin impregnated glass fiber DC bushing, which has the following beneficial effects.

In the embodiments of the present disclosure, the epoxy resin impregnated glass fiber is wound at the high temperature in a range of 90° C. to 120° C., so as to facilitate the initial curing process of the core. The length of each layer of the capacitive screen or the resistive screen wound by the semi-conductive tape is designed depending on insulation requirements, and the thickness of each layer of capacitive screen or resistive screen is designed in a range of 2.5 mm to 5 mm, so that the reasonable field strength distribution of the bushing is achieved, and the design with equal thickness reduces the difficulty of the winding process of the core of the bushing. A collector ring connected to the tap or the voltage screen is provided inside the bushing near the flange, which is grounded to release the accumulated charges (or space accumulated charges) generated during operation, thereby ensuring the reliable operation of the products.

Figure 1:
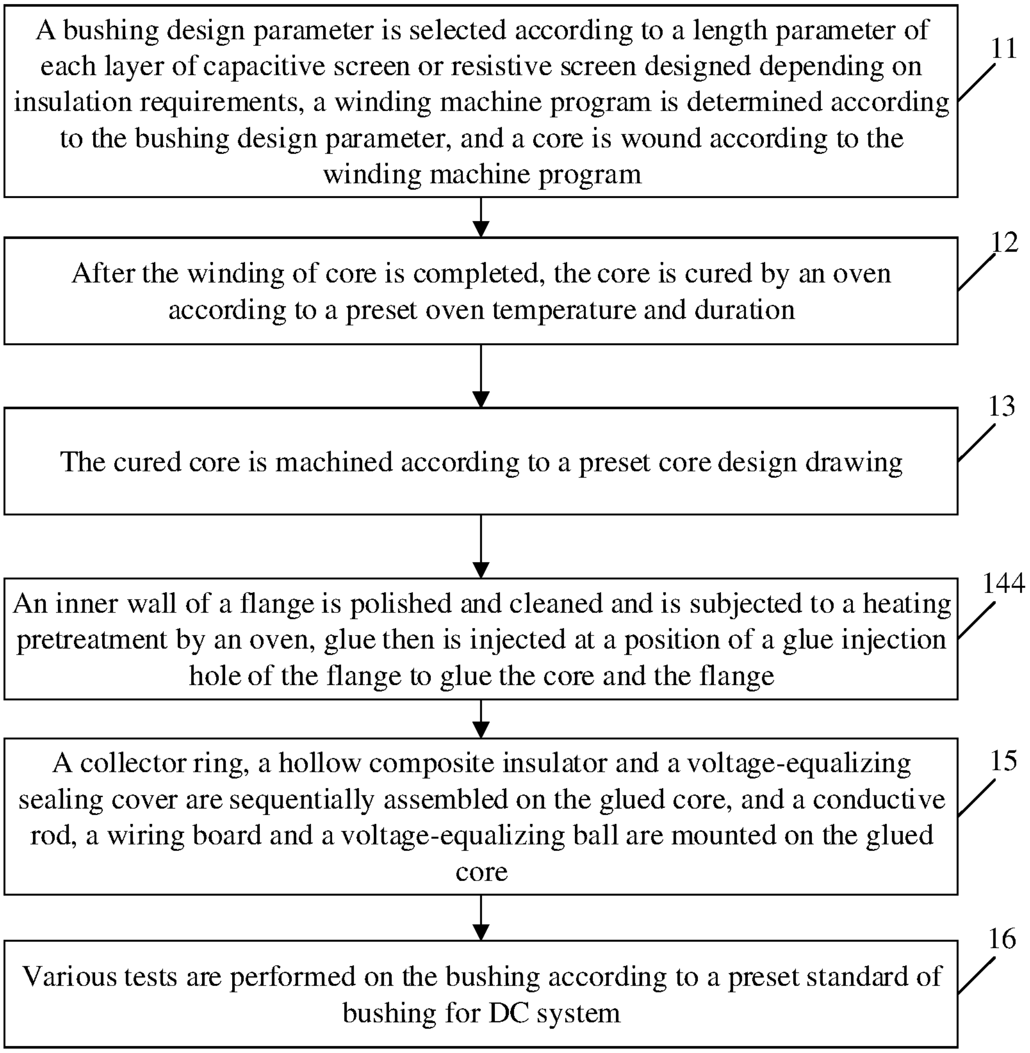
FIG. 1 is a flow chart of a method for developing an epoxy resin impregnated glass fiber DC bushing according to an embodiment of the present disclosure.

In the drawings, "a" represents the thickness between each two layers of capacitive screens (or resistive screens) of the core of the DC bushing; and "b1" and "b2" represent two layers of capacitive screens (or resistive screens) of the core of the DC bushing.

DETAILED DESCRIPTION

The technical solutions in the embodiments of the present disclosure will be clearly and completely described below with reference to the accompanying drawings in the embodiments of the present disclosure. Obviously, the embodiments described here are merely some rather than all of the embodiments of the present disclosure. The examples of the embodiments are shown in the accompanying drawings, in which the same or similar reference numerals denote the same or similar elements or the elements with the same or similar functions from beginning to end. The embodiments described below with reference to the accompanying drawings are exemplary, which are intended to explain the present disclosure, but should not be constructed as a limitation of the present disclosure.

The embodiments of the present disclosure provide a method for developing an epoxy resin impregnated glass fiber Direct Current (DC) bushing. FIG. 1 is a flow chart of a method for developing an epoxy resin impregnated glass fiber DC bushing according to an embodiment of the present disclosure. As shown in FIG. 1, the method includes the following operations.

In operation 11, a bushing design parameter is selected according to a length parameter of each layer of capacitive screen or resistive screen designed depending on insulation requirements, a winding machine program is determined according to the bushing design parameter, and a core is wound according to the winding machine program, in which the core begins to be initially cured during winding of the core.

In operation 12, after the winding of the core is completed, the core is cured by an oven according to a preset oven temperature and duration.

In operation 13, the cured core is machined according to a preset core design drawing.

In operation 14, after an inner wall of a flange is polished and cleaned and is subjected to a heating pretreatment by an oven, glue is injected at a position of a glue injection hole of the flange, to glue the core and the flange.

In operation 15, a collector ring, a hollow composite insulator and a voltage-equalizing sealing cover are sequentially assembled on the glued core, and a conductive rod, a wiring board and a voltage-equalizing ball are mounted on the glued core.

In operation 16, various tests are performed on the bushing according to a preset standard of bushing for DC system.

Figure 2:
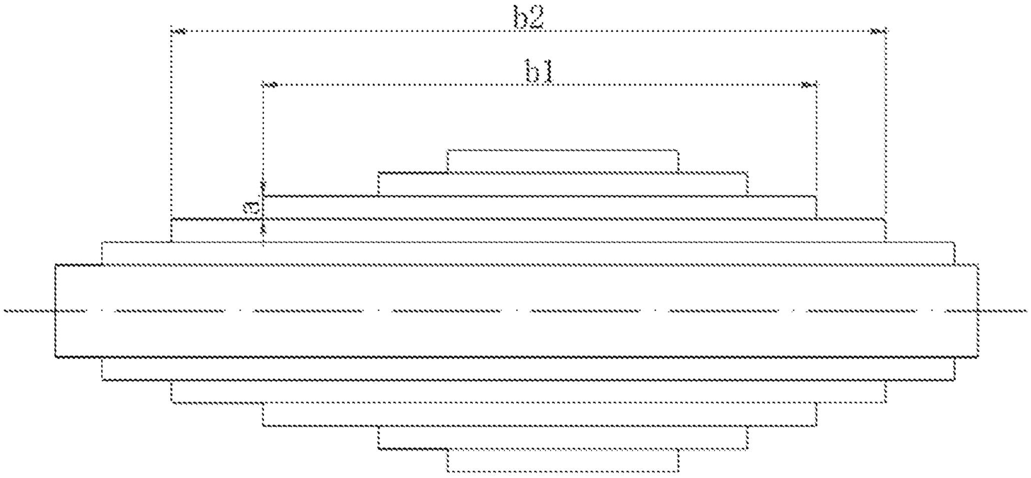
FIG. 2 is a schematic diagram of a core of a DC bushing (of a converter transformer) according to an embodiment of the present disclosure.

FIG. 2 is a schematic diagram of a core of a DC bushing (of a converter transformer) according to an embodiment of the present disclosure. As shown in FIG. 2, "a" denotes the thickness between each two layers of capacitive screens (or resistive screens) of the core of the DC bushing, and "b1" and "b2" denote two layers of capacitive screens (or resistive screens) of the core of the DC bushing. Illustratively, both the top side and the bottom side of the "rectangle" in FIG. 2 represent the capacitive screens (or resistive screens), and "a" denotes the thickness between the two layers of capacitive screens (or resistive screens).

In some optional embodiments, a thickness between each two layers of capacitive screens or resistive screens is the same, and a thickness of each layer of capacitive screen or resistive screen is selected from the bushing design parameter in a range of 2.5 millimeters (mm) to 5 mm.

In some optional embodiments, a winding temperature in the winding machine program is in a range of 90° C. to 120° C.

In some optional embodiments, during the machining of the cured core, an amount of feed for rough machining is no more than 0.5 mm, and an amount of feed for fine machining is no more than 0.1 mm.

In some optional embodiments, the method further includes the following operation. After the glue is injected at the position of the glue injection hole of the flange, it is required to stand for 24 hours.

In some optional embodiments, the method further includes the following operation. After the inner wall of the flange is polished and cleaned, an adhesive is evenly applied at the inner wall of the flange.

In some optional embodiments, the method further includes the following operation. After the heating pretreatment is performed by the oven, the flange is secured to the core and a sealing ring is mounted on the core.

In some optional embodiments, the method further includes the following operation. Before the collector ring, the hollow composite insulator and the voltage-equalizing sealing cover are sequentially assembled on the glued core and the conductive rod, the wiring board and the voltage-equalizing ball are mounted on the glued core, an oil-impregnated end of the glued core is sprayed with paint.

Figure 3:
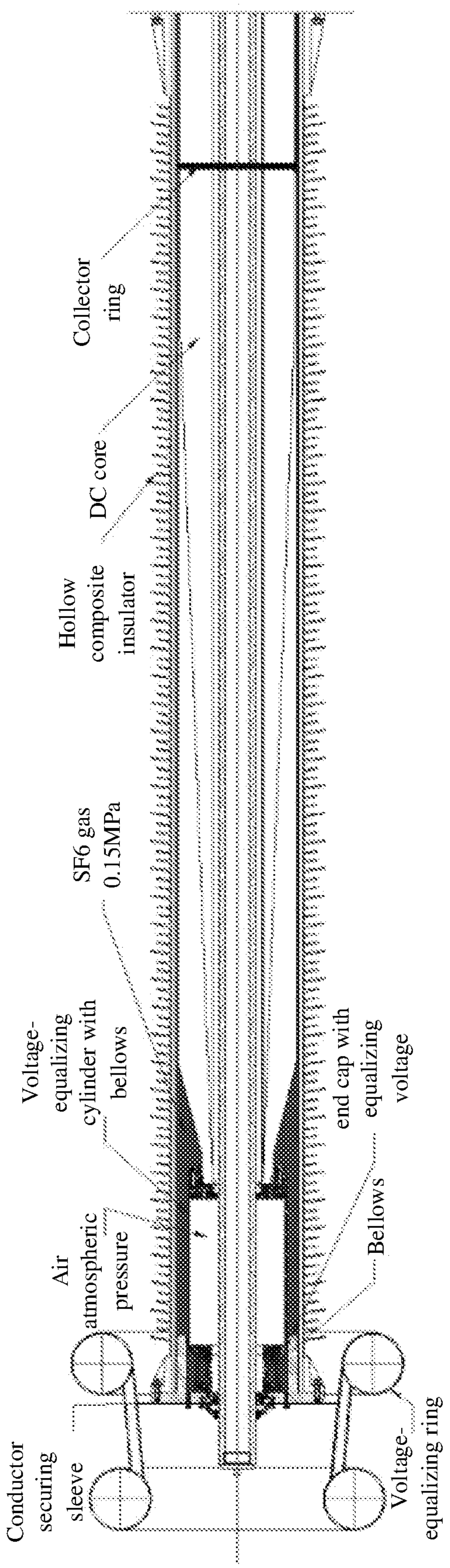
FIG. 3 is a schematic diagram showing connection between an indoor end of a tap or a voltage screen of a core of a DC bushing (of a converter transformer) and a collector ring according to an embodiment of the present disclosure.
Figure 4:
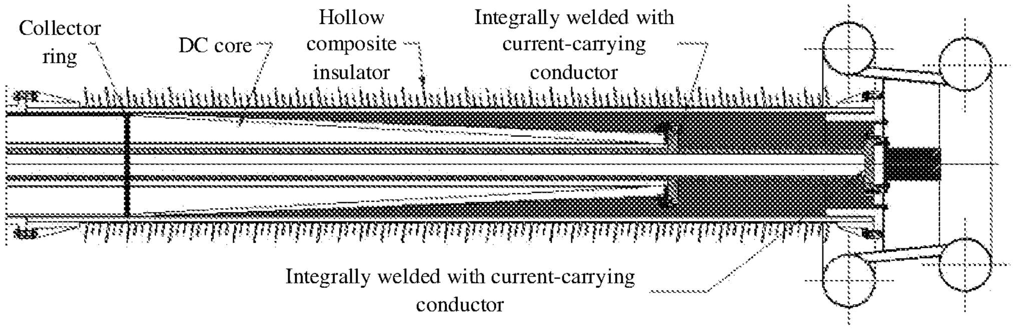
FIG. 4 is a schematic diagram showing connection between an outdoor end of a tap or a voltage screen of a core of a DC bushing (of a converter transformer) and a collector ring according to an embodiment of the present disclosure.

FIG. 3 is a schematic diagram showing connection between an indoor end of a tap or a voltage screen of a core of a DC bushing (of a converter transformer) and a collector ring according to an embodiment of the present disclosure. FIG. 4 is a schematic diagram showing connection between an outdoor end of a tap or a voltage screen of a core of a DC bushing (of a converter transformer) and a collector ring according to an embodiment of the present disclosure.

Herein, illustratively, in the operation that various tests are performed on the bushing according to the preset standard of bushing for DC system, the preset standard GB/T22674-2008 can be specifically adopted to perform various tests on the bushing. The standard GB/T22674-2008 is the standard of bushing for DC system, which is one of National Standards of the People's Republic of China. Of course, the embodiments of the present disclosure are not limited to the above standard of bushing for DC system.

The method for developing an epoxy resin impregnated glass fiber DC bushing according to the embodiments of the present disclosure are described below in combination with the specific examples.

First Example

The embodiments of the present disclosure provide a method for developing an epoxy resin impregnated glass fiber DC bushing, which includes the following operations.

In S1, the core is wound. According to a length parameter of each layer of capacitive screen or resistive screen designed depending on insulation requirements, a bushing design parameter is selected in such a manner that a thickness between each two layers of capacitive screens or resistive screens is the same, and a thickness of each layer of capacitive screen or resistive screen is 2.5 mm; a winding machine program is determined according to the bushing design parameter; and a core is wound according to the winding machine program, in which a winding temperature in the winding machine program is 90° C., and the core is gradually initially cured during winding of the core.

In S2, the core is cured. After the winding of the core is completed, the core is sent into an oven and cured according to a preset reasonable oven temperature and duration to ensure that the core is completely cured.

In S3, the cured core is machined. The cured core is machined according to a preset core design drawing. During the machining, an amount of feed for rough machining is 0.1 mm, and an amount of feed for fine machining is 0.02 mm. Then the machining of the core is completed.

In S4, the core and a flange are glued to each other. After an inner wall of the flange is polished and cleaned, the inner wall of the flange is evenly applied with an adhesive and is followed by being subjected to a heating pretreatment by the oven, the flange then is secured at a suitable position of the core and a sealing ring is mounted on the core, and glue is injected at a position of a glue injection hole of the flange by using a glue gun to glue the core and the flange, and let it stand for 24 hours.

In S5, the components are assembled. An oil-impregnated end of the glued core (of the DC bushing of the converter transformer) is sprayed with paint, a collector ring, a hollow composite insulator and a voltage-equalizing sealing cover are sequentially assembled on the glued core, and a conductive rod, a wiring board and a voltage-equalizing ball are mounted on the glued core.

In S6, tests are performed on the bushing. Various tests are performed on the bushing according to a standard GB/T22674-2008 (a national standard of bushing for DC system).

Second Example

The embodiments of the present disclosure further provide a method for developing an epoxy resin impregnated glass fiber DC bushing, which includes the following operations.

In S1, the core is wound. According to a length parameter of each layer of capacitive screen or resistive screen designed depending on insulation requirements, a bushing design parameter is selected in such a manner that a thickness between each two layers of capacitive screens is the same, and a thickness of each layer of capacitive screen or resistive screen is 3 mm; a winding machine program is determined according to the bushing design parameter; and a core is wound according to the winding machine program, in which a winding temperature in the winding machine program is 95° C., and the core is gradually initially cured during winding of the core.

In S2, the core is cured. After the winding of the core is completed, the core is sent into an oven and cured according to a preset reasonable oven temperature and duration to ensure that the core is completely cured.

In S3, the cured core is machined. The cured core is machined according to a preset core design drawing. During the machining, an amount of feed for rough machining is 0.2 mm, and an amount of feed for fine machining is 0.04 mm. Then the machining of the core is completed.

In S4, the core and a flange are glued to each other. After an inner wall of the flange is polished and cleaned, the inner wall of the flange is evenly applied with an adhesive and is followed by being subjected to a heating pretreatment by the oven, the flange is then secured at a suitable position of the core and a sealing ring is mounted on the core, and glue is injected at a position of a glue injection hole of the flange by using a glue gun to glue the core and the flange, and let it stand for 24 hours.

In S5, the components are assembled. An oil-impregnated end of the glued core (of the DC bushing of the converter transformer) is sprayed with paint, a collector ring, a hollow composite insulator and a voltage-equalizing sealing cover are sequentially assembled on the glued core, and a conductive rod, a wiring board and a voltage-equalizing ball are mounted on the glued core.

In S6, tests are performed on the bushing. Various tests are performed on the bushing according to a standard GB/T22674-2008 (a national standard of bushing for DC system).

Third Example

The embodiments of the present disclosure further provide a method for developing an epoxy resin impregnated glass fiber DC bushing, which includes the following operations.

In S1, the core is wound. According to a length parameter of each layer of capacitive screen or resistive screen designed depending on insulation requirements, a bushing design parameter is selected in such a manner that a thickness between each two layers of capacitive screens or the resistive screens is the same, and a thickness of each layer of capacitive screen or resistive screen is 3.5 mm; a winding machine program is determined according to the bushing design parameter; and a core is wound according to the winding machine program, in which a winding temperature in the winding machine program is 100° C., and the core is gradually initially cured during winding of the core.

In S2, the core is cured. After the winding of the core is completed, the core is sent into an oven and cured according to a preset reasonable oven temperature and duration to ensure that the core is completely cured.

In S3, the cured core is machined. The cured core is machined according to a preset core design drawing. During the machining, an amount of feed for rough machining is 0.3 mm, and an amount of feed for fine machining is 0.06 mm. Then the machining of the core is completed.

In S4, the core and a flange are glued to each other. After an inner wall of the flange is polished and cleaned, the inner wall of the flange is evenly applied with an adhesive and is followed by being subjected to a heating pretreatment by the oven, the flange is then secured at a suitable position of the core and a sealing ring is mounted on the core, and glue is injected at a position of a glue injection hole of the flange by using a glue gun to glue the core and the flange, and let it stand for 24 hours.

In S5, the components are assembled. An oil-impregnated end of the glued core (of the DC bushing of the converter transformer) is sprayed with paint, a collector ring, a hollow composite insulator and a voltage-equalizing sealing cover are sequentially assembled on the glued core, and a conductive rod, a wiring board and a voltage-equalizing ball are mounted on the glued core.

In S6, tests are performed on the bushing. Various tests are performed on the bushing according to a standard GB/T22674-2008 (a national standard of bushing for DC system).

Fourth Example

The embodiments of the present disclosure further provide a method for developing an epoxy resin impregnated glass fiber DC bushing, which includes the following operations.

In S1, the core is wound. According to a length parameter of each layer of capacitive screen or resistive screen designed depending on insulation requirements, a bushing design parameter is selected in such a manner that a thickness between each two layers of capacitive screens is the same, and a thickness of each layer of capacitive screen or resistive screen is 4 mm; a winding machine program is determined according to the bushing design parameter; and a core is wound according to the winding machine program, in which a winding temperature in the winding machine program is 110° C., and the core is gradually initially cured during winding of the core.

In S2, the core is cured. After the winding of the core is completed, the core is sent into an oven and cured according to a preset reasonable oven temperature and duration to ensure that the core is completely cured.

In S3, the cured core is machined. The cured core is machined according to a preset core design drawing. An amount of feed for rough machining is 0.4 mm, and an amount of feed for fine machining is 0.08 mm. Then the machining of the core is completed.

In S4, the core and a flange are glued to each other. After an inner wall of the flange is polished and cleaned, the inner wall of the flange is evenly applied with an adhesive and is followed by being subjected to a heating pretreatment by the oven, the flange is then secured at a suitable position of the core and a sealing ring is mounted on the core, and glue is injected at a position of a glue injection hole of the flange by using a glue gun to glue the core and the flange, and let it stand for 24 hours.

In S5, the components are assembled. An oil-impregnated end of the glued core (of the DC bushing of the converter transformer) is sprayed with paint, a collector ring, a hollow composite insulator and a voltage-equalizing sealing cover are sequentially assembled on the glued core, and a conductive rod, a wiring board and a voltage-equalizing ball are mounted on the glued core.

In S6, tests are performed on the bushing. Various tests are performed on the bushing according to a standard GB/T22674-2008 (a national standard of bushing for DC system).

Fifth Example

The embodiments of the present disclosure further provide a method for developing an epoxy resin impregnated glass fiber DC bushing, which includes the following operations.

In S1, the core is wound. According to a length parameter of each layer of capacitive screen or resistive screen designed depending on insulation requirements, a bushing design parameter is selected in such a manner that a thickness between each two layers of capacitive screens or resistive screens is the same, and a thickness of each layer of capacitive screen or resistive screen is 5 mm; a winding machine program is determined according to the bushing design parameter; and a core is wound according to the winding machine program, in which a winding temperature in the winding machine program is 120° C., and the core is gradually initially cured during winding of the core.

In S2, the core is cured. After the winding of core is completed, the core is sent into an oven and cured according to a preset reasonable oven temperature and duration to ensure that the core is completely cured.

In S3, the cured core is machined. The cured core is machined according to a preset core design drawing. During the machining, an amount of feed for rough machining is 0.5 mm, and an amount of feed for fine machining is 0.1 mm. Then the machining of the core is completed.

In S4, the core and a flange are glued to each other. After an inner wall of the flange is polished and cleaned, the inner wall of the flange is evenly applied with an adhesive, and is followed by being subjected to a heating pretreatment by the oven, the flange is then secured at a suitable position of the core and a sealing ring is mounted on the core, and glue is injected at a position of a glue injection hole of the flange by using a glue gun to glue the core and the flange, and let it stand for 24 hours.

In S5, the components are assembled. An oil-impregnated end of the glued core (of the DC bushing of the converter transformer) is sprayed with paint, a collector ring, a hollow composite insulator and a voltage-equalizing sealing cover are sequentially assembled on the glued core, and a conductive rod, a wiring board and a voltage-equalizing ball are mounted on the glued core.

In S6, tests are performed on the bushing. Various tests are performed on the bushing according to a standard GB/T22674-2008 (a national standard of bushing for DC system).

As shown in FIG. 3 and FIG. 4, in the DC bushing (of the converter transformer), the flange is used to support the overall structure of the capacitor core. The core, the voltage equalizing pipe with bellows and the end cap are sealed and locked to each other, so as to form a SF6 gas cavity, which is not the same cavity in which the conductive tube is located. In the state of thermal expansion and contraction, the core is independently extended and contracted through the bellows, and the conductive rod can be freely extended and contracted in the central cavity. The material of the core is different from the material of the conductive rod, and the expansion and contraction ratio of the core is different from that of the conductive rod, so that equivalent expansion and contraction cannot be achieved therebetween. Thus, the expansion and contraction of the core and the conductive rod in different cavities does not affect each other, and does not affect the sealing structures of the two cavities. One end of the conductor is directly secured to the voltage-equalizing cover, so as to form a single SF6 cavity. All the sealing structures are static seals. The conductor is in plane contact with the voltage-equalizing cover, so as to increase the conducting contact area. Generally, the current density of plane contact is designed as 0.2-0.35 A/mm2. A collector ring connected to the tap or the voltage screen is provided inside the core near the flange, which is grounded to release the accumulated charges (or space accumulated charges) generated during operation, thereby ensuring the reliable operation of the product.

Overall, in the embodiments of the present disclosure, the epoxy resin impregnated glass fiber is wound at the high temperature in a range of 90° C. to 120° C., so as to facilitate the initial curing process of the core. The length of each layer of the capacitive screen (or the resistive screen) wound by the semi-conductive tape is designed depending on insulation requirements, and the thickness of each layer of the capacitive screen (or the resistive screen) is designed in a range of 2.5 mm to 5 mm, so that the reasonable field strength distribution of the bushing is achieved, and the design with equal thickness reduces the difficulty of the winding process of the core of the bushing. A collector ring connected to the tap or the voltage screen is provided inside the bushing near the flange, which is grounded to release the accumulated charges (or space accumulated charges) generated during operation, thereby ensuring the reliable operation of the product.

The methods disclosed in the several method embodiments provided by the present disclosure can be combined arbitrarily with each other without conflict to obtain a new method embodiment.

It can be understood by those of ordinary skill in the art that all or part of the steps of the method embodiment may be implemented by related hardware instructed through a program, the program may be stored in a computer-readable storage medium, and when the program is executed, the steps of the method embodiment are implemented. The storage medium includes: various media capable of storing program codes such as a mobile storage device, a Read-Only Memory (ROM), a Random Access Memory (RAM), a magnetic disk or a compact disc.

Or, when being implemented in form of software functional module and sold or used as an independent product, the integrated unit of the disclosure may also be stored in a computer-readable storage medium. Based on such an understanding, the technical solutions of the embodiments of the disclosure substantially or parts contributing to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a mobile hard disk, a ROM, a RAM, a magnetic disk or a compact disc.

The above descriptions are only specific embodiments of the present disclosure, but the protection scope of the present disclosure is not limited thereto. Any skilled in the art, within the technical scope disclosed by the present disclosure, may easily think of variations or replacements, which should fall into the protection scope of the present disclosure. Therefore, the protection scope of the present disclosure should be subject to the protection scope of the claims.

The invention claimed is:

1. A method for developing an epoxy resin impregnated glass fiber Direct Current (DC) bushing, comprising:

selecting a bushing design parameter according to a length parameter of each layer of capacitive screen or resistive screen designed depending on insulation requirements, determining a winding machine program according to the bushing design parameter, and winding a core according to the winding machine program, wherein the core begins to be initially cured during the winding of the core;

after the winding of the core is completed, curing the core by an oven according to a preset oven temperature and duration;

machining the cured core according to a preset core design drawing;

polishing and cleaning an inner wall of a flange and performing a heating pretreatment on the inner wall of the flange by an oven, then injecting glue at a position of a glue injection hole of the flange to glue the core and the flange;

sequentially assembling a collector ring, a hollow composite insulator and a voltage-equalizing sealing cover on the glued core, and mounting a conductive rod, a wiring board and a voltage-equalizing ball on the glued core; and performing various tests on the bushing according to a preset standard of bushing for DC system.

2. The method for developing the epoxy resin impregnated glass fiber DC bushing of claim 1, wherein a thickness between each two layers of capacitive screens or resistive screens is the same, and a thickness of each layer of capacitive screen or resistive screen is selected from the bushing design parameter in a range of 2.5 mm to 5 mm.

3. The method for developing the epoxy resin impregnated glass fiber DC bushing of claim 1, wherein a winding temperature in the winding machine program is in a range of 90° C. to 120° C.

4. The method for developing the epoxy resin impregnated glass fiber DC bushing of claim 1, wherein during the machining of the cured core, an amount of feed for rough machining is no more than 0.5 mm, and an amount of feed for fine machining is no more than 0.1 mm.

5. The method for developing the epoxy resin impregnated glass fiber DC bushing of claim 1, further comprising: after injecting the glue at the position of the glue injection hole of the flange, letting it stand for 24 hours.

6. The method for developing the epoxy resin impregnated glass fiber DC bushing of claim 1, further comprising: after polishing and cleaning the inner wall of the flange, evenly applying an adhesive at the inner wall of the flange.

7. The method for developing the epoxy resin impregnated glass fiber DC bushing of claim 1, further comprising:

after performing the heating pretreatment on the inner wall of the flange by the oven, securing the flange to the core and mounting a sealing ring on the core.

8. The method for developing the epoxy resin impregnated glass fiber DC bushing of claim 1, further comprising:

before sequentially assembling the collector ring, the hollow composite insulator and the voltage-equalizing sealing cover on the glued core and mounting the conductive rod, the wiring board and the voltage-equalizing ball on the glued core, spraying an oil-impregnated end of the glued core with paint.

9. The method for developing the epoxy resin impregnated glass fiber DC bushing of claim 1, further comprising:

forming a SF6 gas cavity by sealing among the core, a voltage-equalizing pipe with bellows and the voltage-equalizing sealing cover.

* * * * *